June 19, 1934.                R. F. PEO                1,963,145
                        HYDRAULIC SHOCK ABSORBER
                  Filed March 18, 1932        2 Sheets-Sheet 2
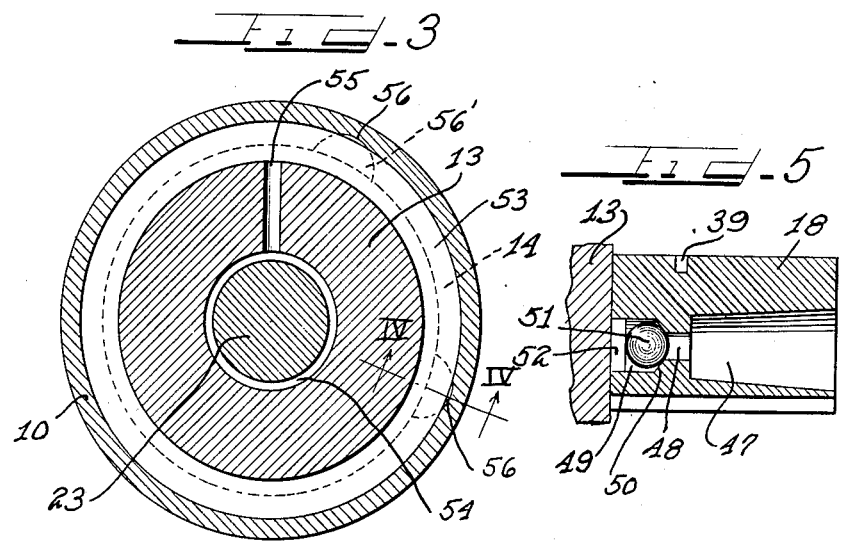
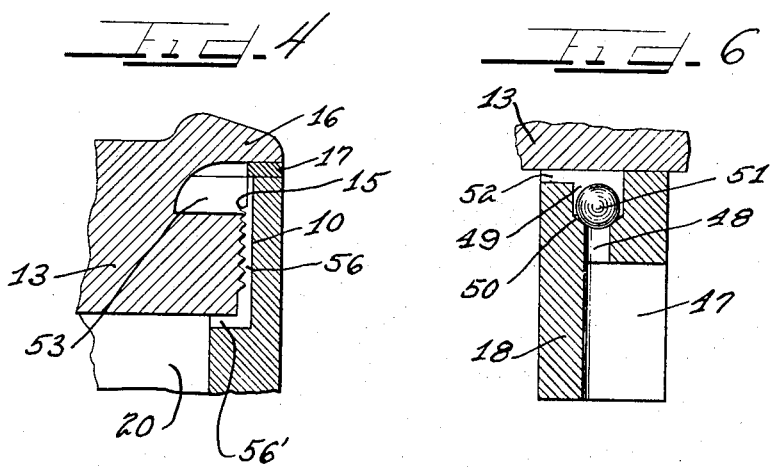
Inventor
Ralph F. Peo.
by Charles Kellen
Attys.

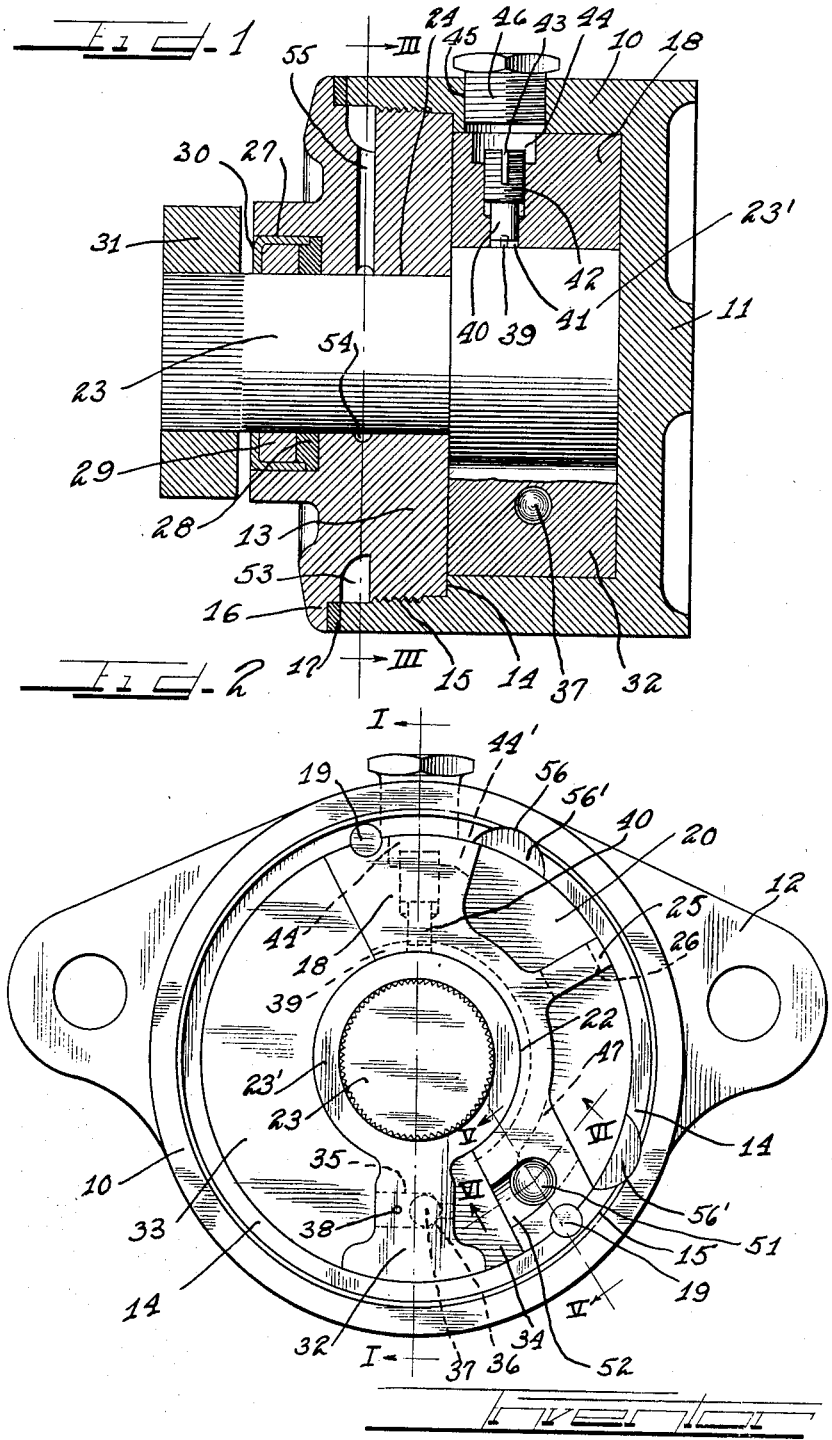

Patented June 19, 1934

1,963,145

UNITED STATES PATENT OFFICE 1,963,145

HYDRAULIC SHOCK ABSORBER

Ralph F. Peo, Buffalo, N. Y., assignor to Houde Engineering Corporation, Buffalo, N. Y., a corporation of New York Application March 18, 1932, Serial No. 599,649

5 Claims. (Cl. 188—89)

My invention relates to hydraulic shock absorbers in which a replenishing chamber is provided for replenishing the piston working chambers with resistance fluid, the object of the invention being to provide an improved construction and arrangement for restoring to the replenishing chamber any fluid which may leak out of the working chambers between the piston structure and its bearing supports and between joined parts of the shock absorber housing so that the fluid may not escape to the exterior of the shock absorber and be wasted.

The features of my invention are shown incorporated in the structures disclosed on the drawings, in which drawings:

Figure 1 is a diametral sectional view of the shock absorber on plane I—I of Figure 2;

Figure 2 is a front view of the shock absorber body with the closure head removed therefrom;

Figure 3 is a section on a reduced scale on plane III—III of Figure 1;

Figure 4 is an enlarged section on plane IV—IV of Figure 3;

Figure 5 is an enlarged section on plane V—V of Figure 2; and

Figure 6 is an enlarged section on plane VI—VI of Figure 2.

The housing of the shock absorber shown comprises the body part formed by the annular wall 10 having the rear head or base 11 formed integral therewith and provided with ears 12 by which the body may be secured to a suitable support as for example the chassis of an automotive vehicle. At its outer end the wall 10 is recessed to receive the closure and bearing head 13 and to provide the annular internal shoulder 14 against which the base of the head seats, the cylindrical wall 10, base 11 and the head 13 enclosing a cylindrical space. The body of the head 13 is threaded to engage the thread 15 in the recess 10 of the annular wall 10, the head being thus rigidly secured to the wall 10, the outer peripheral flange 16 on the head overlying the outer edge of the wall 10 and the gasket 17 of suitable material being interposed to form a leak-proof joint.

Within the wall 10 and between the base 11 thereof and the head 13 is fitted a partition wall 18, the wall being shown secured by pins or keys 19 extending through companion slots formed in the partition and in the wall 10. The inner face of the partition 18 is shown in a plane extending through the axis of the cylindrical wall 10 to provide a semi-cylindrical working space for the shock absorber piston structure, while the partition 18 is cut out on its opposite side, to provide a replenishing chamber 20. The partition is also cut away to provide the semi-cylindrical bearing recess 22 with which the hub 23' of the shaft 23 has bearing engagement, this hub extending between the base wall 11 and the head 13 and the shaft 23 extending through and having bearing in the bearing bore 24 through the head 13. To strengthen the partition 18 it may be provided with a strut 25 extending from its bearing section to the wall 10 but this strut has the passageway 26 therethrough so that the entire space beween the partition and the wall 10 forms the fluid reservoir space 20.

On its other side the head 13 has the recess 27 for receiving the inner packing 28 which may be a rubber washer, and the outer packing 29 which may be cork, and the sheet metal cup 30 is preferably inserted with friction engagement in the recess 27 to surround the outer packing 29 and part of the washer 28 and to abut against the washer to thus hold the packings in place. The outer end of the shaft 23 is knurled to intimately receive the hub 31 of the shock absorber arm which at its end is connected usually with the vehicle axle so that during travel of a vehicle and relative movement between its chassis and the axle the shaft 23 will be oscillated.

The hub 23' has the piston 32 integral therewith and extending therefrom for engagement by its outer surface with the cylindrical inner side of the wall 10, the piston dividing the working chamber into the high pressure side 33 and the low pressure side 34. Through the piston 32 is a relief by-passageway 35 in which is the valve seat 36 for the ball valve 37, the ball being confined in the passageway as by means of a pin 38. The valve seat faces the high pressure chamber 33 so that during high pressure movement or clockwise movement (Figure 2) of the hub 23' and the piston, the passageway 35 will be closed against the flow of fluid from the high pressure to the low pressure chamber, but when the piston is moved in the opposite direction the valve will open the passageway for the escape of fluid from the low pressure chamber 34 to the high pressure chamber 33, this being usually during movement of the vehicle chassis and axle toward each other, the closure of the passageway occurring during rebound movement of the piston.

Another relief passageway is provided for flow of fluid from one side of the piston to the other, this passageway being in the form of a circumferentially extending channel 39 in the partition wall 18. The area of this by-passageway is controlled by a valve stem 40 in the radially extending bore 41 in the partition 18, the stem having the threaded head 42 engaging the upper threaded end of the bore and provided with a screwdriver slot 43 by which it may be readily turned for adjusting the location of the end of the valve stem in the passageway 39. The outer end of the bore 41 is enlarged to form the space 44 which has the side outlet 44' communicating with the replenishing chamber or space 20. In the wall 10, and in axial alignment with the bore 41 is the replenishing opening 45 adapted to be closed by a threaded plug 46. Through this opening fluid may be poured into the replenishing chamber and through this opening the valve is also accessible for adjustment of the by-passageway 39. During pressure or rebound stroke of the piston, the passageway 35 through the piston will be closed and flow of fluid from the high pressure chamber to the low pressure chamber can be only by way of the more or less restricted by-passageway 39.

On the inner side of the partition wall 18 and at the lower end thereof is the recess 47 which is connected by the forwardly extending port 48 with the valve chamber 49, the valve seat 50 surrounding the outer end of the port to be engaged by a ball valve 51. The outer end of the valve chamber is covered by the head 13 but the outer end of the valve chamber is connected with the low pressure working chamber by the lateral port or passageway 52 (Fig. 2, 5 and 6). With this valving arrangement fluid may flow from the replenishing chamber into the low pressure working chamber during pressure or rebound stroke of the piston to keep the working chamber filled with fluid, but during the low pressure stroke of the piston the valve 51 will be forced to its seat to close the replenishing passageway.

Due to the pressure to which the fluid is subjected particularly during the pressure or rebound stroke of the piston, some of the fluid may be forced into the bearing bore 24 for the shaft, or may force its way out between the wall 10 and the body of the head 13.

I provide improved means for collecting or recuperating this fluid and returning it to the replenishing chamber. Between its threaded body and the flange 16 the head 13 is recessed to provide the annular recuperating or collecting channel 53 for receiving the fluid forced out between the wall 10 and the head and past the threading 15, and in the head and surrounding the shaft 23, I provide the annular recuperating channel 54 and these recuperating channels are interconnected by one or more passageways 55 through the head. The fluid is returned from the recuperating channel 53 to the replenishing chamber by one or more return passageways 56. As best shown in Figures 2, 3 and 4, these return passageways are provided by milling out the wall 10 adjacent to the threaded body of the head 13, such milling to extend radially a slight distance beyond the threading 15 and axially a slight distance below the shoulder 14 so as to leave the passageways 56 connecting at their outer ends with the recuperating channel 53, and the radial passageways 56' connecting the inner end of the passageways 56 with the replenishing space or chamber 20. I have shown such return passageway at the upper end of the replenishing chamber and another at the lower end thereof and any fluid collected in the recuperating channel 53 may thus readily flow back to the replenishing chamber, such return flow being a gravitational flow and not a pressure flow. I preferably provide only one connecting passage 55 between the recuperating channel 54 and the recuperating channel 53 and with such passageway 55 extending upwardly so that fluid collected in the channel 54 will rise in the passageway 55 and overflow into the recuperating channel 53, and where the fluid has lubricating qualities, such as oil, the oil in the passageway 55 will serve for lubricating the shaft bearing 23, the shaft packing within the recess 27 preventing escape of the oil to the exterior.

Should any of the fluid which is forced out of the piston working chamber travel circumferentially along the threading joint between the head 13 and the wall 10 such fluid will eventually reach the return passageway sections 56 and will flow to the return passageway sections 56' and to the replenishing chamber. Thus any fluid which is forced out of the piston working chambers is collected by the recuperating channels and passageways and is returned to the replenishing chamber so that there will be no loss of fluid from the shock absorber structure. The cuts forming the passageways 56 are comparatively shallow in order to avoid weakening of the wall 10 and the threading and therefore by having a passageway 56 connecting the top of the channel 53 with the top of the replenishing chamber the lower passageway is materially assisted by the upper passageway in returning to the replenishing chamber the fluid which rapidly collects in the recuperating channel during operation of the shock absorber. Furthermore, the upper passageway will permit any gas or air trapped in the channel 53 to escape into the upper end of the replenishing chamber.

I have shown a practical and efficient embodiment of the features of my invention but I do not desire to be limited to the exact details of construction and arrangement shown as changes and modifications may be made without departing from the scope of the invention as defined by the appended claims.

I claim as follows:

1. A hydraulic shock absorber comprising a body having a peripheral wall and a rear wall, and a front head connected with said peripheral wall by a joint and provided with a central bearing bore, said wall and head enclosing a cylindrical space for containing resistance fluid, a partition within said space at one side of a diametral plane thereof for dividing said space into a working chamber and a replenishing chamber, a piston for operating in said working chamber and a shaft extending from said piston through said bearing bore, there being an annular recuperating channel between said front head and peripheral wall and communicating with the joint between said front head and wall whereby to receive fluid escaping through said joint during operation of said shock absorber, and a return passage cut in the peripheral wall adjacent to said joint for returning to the lower part of the replenishing chamber the fluid collected in said recuperating channel.

2. In a hydraulic shock absorber the combination of walls for enclosing a cylindrical space for containing resistance fluid, a partition wall dividing said space into a working chamber at one side of the vertical axis of said space and a replenishing chamber at the opposite side, a piston adapted to be oscillated in said working chamber, there being a by-passageway through said partition wall for flow of fluid from one side of the piston to the other, a valve mounted in the upper end of said partition wall for controlling said by-passageway, a passageway in said partition wall above said valve communicating with said replenishing chamber, and a fluid filling opening in the space forming wall above said passageway for filling fluid into said replenishing chamber, said filling opening permitting access to said valve for adjustment thereof.

3. A hydraulic shock absorber comprising a housing enclosing a cylindrical space for containing resistance fluid, a partition within said housing extending from the top of said space and downwardly to near the bottom thereof to divide said space into a working chamber and a replenishing chamber, said housing having an axially extending bearing bore and a shaft journalled in said bore, a hub on the inner end of said shaft located in said cylindrical space and said partition having a bearing recess receiving said hub, a piston extending from said hub into the working chamber to be oscillated therein by said shaft, a by-passageway between said hub and partition for the flow of fluid from one side of the piston to the other, there being a filling opening through said housing above said partition and said partition having a filling passageway leading from said filling opening to the replenishing chamber, a valve in said partition below said filling opening to cooperate with said by-passageway to control the by-passage flow of fluid, said valve being accessible to said filling opening for adjustment, and a valve controlled replenishing passage from the lower part of said replenishing chamber to the lower part of said working chamber.

4. A hydraulic shock absorber comprising a body having a cylindrical wall, a rear wall, and a front head connected with said cylindrical wall by a joint and provided with a central bearing bore, said walls and head forming a cylindrical space for containing resistance fluid, a partition dividing said space to form a working chamber and a replenishing chamber at opposite sides of said partition and a shaft extending through said bearing bore, there being an annular recuperating channel between said front head and cylindrical wall and communicating with the joint between said head and wall whereby to receive fluid escaping through said joint during operation of the shock absorber, a return passage for the free flow of fluid from the lower part of said recuperating channel to the lower part of said replenishing chamber, and another return passage for the free flow of fluid and any collected gas from the top of the recuperating channel to the top of the replenishing chamber.

5. A hydraulic shock absorber comprising a body having a peripheral wall and a rear wall, and a front head extending into and connected to said peripheral wall by a threaded joint and provided with a central bearing bore, said wall and head enclosing a cylindrical space for containing resistance fluid, a partition dividing said space into a working chamber and a replenishing chamber, a piston for operating in said working chamber and a shaft extending from said piston through said bearing bore, there being an annular recuperating channel between said front head and peripheral wall at the outer end of and communicating with the joint between said front head and wall whereby to receive fluid escaping through said joint during operation of the shock absorber, and a slot cut in the peripheral wall and extending transversely through the threads at said joint for returning to the replenishing chamber any fluid collected in said recuperating channel and for intercepting any escapement fluid flowing along the threading of said joint and returning it to the replenishing chamber.

RALPH F. PEO.